United States Patent
Kim et al.

(10) Patent No.: US 8,634,180 B2
(45) Date of Patent: Jan. 21, 2014

(54) MULTI-LAYERED CERAMIC CAPACITOR HAVING DUAL LAYER-ELECTRODE STRUCTURE

(75) Inventors: Hyun Tae Kim, Seoul (KR); Jin Ju Park, Gyunggi-do (KR); Se Hyun Kim, Gyunggi-do (KR); Doo Young Kim, Gyunggi-do (KR); Kyung Nam Hwang, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 94 days.

(21) Appl. No.: 13/302,375

(22) Filed: Nov. 22, 2011

(65) Prior Publication Data

US 2012/0134066 A1 May 31, 2012

(30) Foreign Application Priority Data

Nov. 25, 2010 (KR) .................. 10-2010-0118141

(51) Int. Cl.
*H01G 4/008* (2006.01)

(52) U.S. Cl.
USPC ........... 361/305; 361/303; 361/311; 361/313; 361/301.4; 361/321.1

(58) Field of Classification Search
USPC .......... 361/321.1, 321.2, 301.4, 306.1, 306.3, 361/311–313
See application file for complete search history.

(56) References Cited

U.S. PATENT DOCUMENTS 7,751,175 B2 * 7/2010 Nagamoto et al. ......... 361/306.3

FOREIGN PATENT DOCUMENTS

| KR | 100293182 | 4/2001 |
| KR | 2007-0103153 | 10/2007 |
| KR | 2008-0032883 | 4/2008 |
| KR | 10-2010-0037834 A | 4/2010 |

OTHER PUBLICATIONS

Korean Office Action, and the English translation thereof, issued in Korean Patent Application No. 10-2010-0118141 dated Dec. 6, 2011.

* cited by examiner

*Primary Examiner* — Nguyen T Ha
(74) *Attorney, Agent, or Firm* — McDermott Will & Emery LLP

(57) ABSTRACT

There is provided a multi-layered ceramic capacitor having a dual layer-electrode structure formed by applying a dual layer of electrode paste to the multi-layered ceramic capacitor. The multi-layered ceramic capacitor having a dual layer-electrode structure includes a capacitor body having a preset length and width and having a plurality dielectric layers stacked therein, an internal electrode unit formed on the plurality of dielectric layers and having a preset capacitance, and an external electrode unit including first external electrodes respectively formed on both sides of the capacitor body to be electrically connected to internal electrodes, and second external electrodes formed on the first external electrodes.

7 Claims, 1 Drawing Sheet

MULTI-LAYERED CERAMIC CAPACITOR HAVING DUAL LAYER-ELECTRODE STRUCTURE

CROSS-REFERENCE TO RELATED APPLICATIONS

This application claims the priority of Korean Patent Application No. 10-2010-0118141 filed on Nov. 25, 2010, in the Korean Intellectual Property Office, the disclosure of which is incorporated herein by reference.

BACKGROUND OF THE INVENTION

1. Field of the Invention

The present invention relates to a multi-layered ceramic capacitor, and more particularly, to a multi-layered ceramic capacitor having a dual layer-electrode structure formed by applying a dual layer of electrode paste to the multi-layered ceramic capacitor.

2. Description of the Related Art

Generally, a multi-layered ceramic capacitor (MLCC) has a structure in which internal electrodes are inserted between a plurality of dielectric layers. The multi-layered ceramic capacitor has been widely used as a component of various electronic devices due to advantages such as the compact size, high capacitance and easy mounting thereof, and particularly, the multi-layered ceramic capacitor has been actively used as a decoupling capacitor connected between a semiconductor chip and a power supply in a power supply circuit in a large scale integrated circuit (LSI), and the like.

External electrodes are formed on the multi-layered ceramic capacitor by applying two layers of conductive paste to outer portions of a ceramic sintering body in order to electrically connect the internal electrodes in the ceramic sintering body to an external circuit.

The external electrodes serve to protect the internal electrodes to keep aspects of a surrounding environment, such as humidity or plating solution, from having an effect on the reliability thereof, while simultaneously providing an electrical connection between the internal and external electrodes.

Meanwhile, in accordance with the development of various related technologies, the capacitance of the multi-layered ceramic capacitor has been gradually increased, and a ratio occupied by the internal electrodes in the ceramic sintering body has been correspondingly gradually increased, such that an increase in contact between the internal and external electrodes and the protection of the internal electrodes from the external environment have become evermore important. Therefore, a need exists for a multi-layered ceramic capacitor including external electrodes having excellent density, while having excellent contact between external and internal electrodes.

SUMMARY OF THE INVENTION

An aspect of the present invention provides a multi-layered ceramic capacitor having a dual layer-electrode structure formed by applying a dual layer of electrode paste to the multi-layered ceramic capacitor.

According to an aspect of the present invention, there is provided a multi-layered ceramic capacitor having a dual layer-electrode structure, including: a capacitor body formed as a stack of dielectric layers, each having a preset length and width; an internal electrode unit formed on the plurality of dielectric layers and having a preset capacitance; and external electrode units including first external electrodes respectively formed on both sides of the capacitor body to be electrically connected to internal electrodes and second external electrodes formed on the first external electrodes.

The first external electrodes may be formed by applying at least one paste of copper (Cu), a copper (Cu) based alloy and a copper-nickel (Cu—Ni) alloy.

The second external electrodes may be formed by applying paste having the same composition as that of the first external electrodes.

The second external electrodes may be made of one of silver (Ag) paste and silver (Ag) epoxy.

The capacitor body may be 0.6 mm±0.05 mm long and 0.3±0.05 mm wide.

The capacitance of the internal electrode unit may be 1 μF±10% or more.

The capacitor body may be 1.0 mm±0.05 mm long and 0.6±0.05 mm wide.

The capacitance of the internal electrode unit may be 10 μF±10% or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings.

Figure 1:
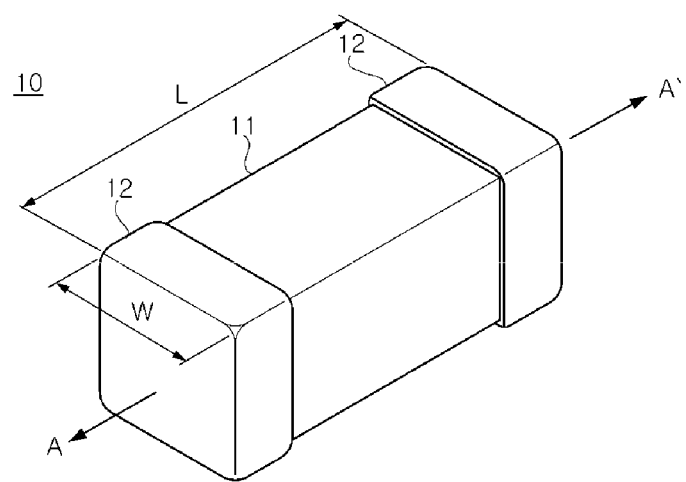
FIG. 1 is a perspective view of a multi-layered ceramic capacitor according to an exemplary embodiment of the present invention.
Figure 2:
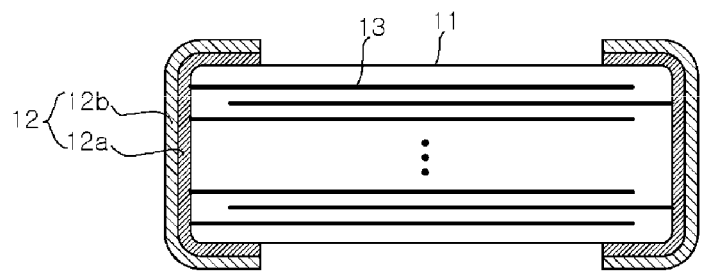
FIG. 2 is a cross-sectional view of the multi-layered ceramic capacitor taken along an AA' direction of FIG. 1.

FIG. 1 is a perspective view of a multi-layered ceramic capacitor according to an exemplary embodiment of the present invention, and FIG. 2 is a cross-sectional view of the multi-layered ceramic capacitor taken along an AA' direction of FIG. 1.

Referring to FIGS. 1 and 2, a multi-layered ceramic capacitor 10, according to an exemplary embodiment of the present invention, may include a capacitor body 11 and an external electrode unit 12.

The capacitor body 11 may be formed of a ceramic sintered body and have a plurality of dielectric layers stacked therein. Each dielectric layers may have a preset length (L) and width (W).

The external electrode unit 12 may include external electrodes respectively formed on both sides of the capacitor body 11.

An internal electrode unit 13 having a plurality of internal electrodes alternated with the plurality of dielectric layers may be formed in the capacitor body 11, and the internal electrode unit 13 may have a preset capacitance. The capacitance of the internal electrode unit 13 may be proportional to the number of stacked internal electrodes.

At this time, the multi-layered ceramic capacitor 10 according to the exemplary embodiment of the present invention may have high capacitance according to a user's demand, wherein the high capacitance may indicate capacitance larger than a predetermined capacitance with respect to the size of the ceramic capacitor 10.

Accordingly, as an example, the capacitor body 11 of the multi-layered ceramic capacitor 10 according to the exemplary embodiment of the present invention may have the length (L) of 0.6 mm±0.05 mm and the width (W) of 0.3±0.05 mm. At this time, the capacitance of the internal electrode unit 13 may have the high capacitance such as 1 µF±10% or more.

As another example, the capacitor body 11 of the multi-layered ceramic capacitor 10 according to the exemplary embodiment of the present invention may have the length (L) of 1.0 mm±0.05 mm and the width (W) of 0.6±0.05 mm. At this time, the capacitance of the internal electrode unit 13 may have the high capacitance such as 10 µF±10% or more.

As described above, in order to have the high capacitance, a ratio occupied by the internal electrode unit 13 in the capacitor body 11 has been gradually increased, such that an increase in contact between the internal and external electrodes and the protection of the internal electrodes from an external environment are more important.

Accordingly, the multi-layered ceramic capacitor 10, according to the exemplary embodiment of the present invention, may include the external electrode unit 12 having the external electrodes respectively formed on both longitudinal sides of the capacitor body 11. The external electrode unit 12 may include first external electrodes 12a respectively formed on both longitudinal sides of the capacitor body 11 to be electrically connected to the internal electrode of the internal electrode unit 13, and second external electrodes 12b formed on the outer surfaces of the first external electrodes 12a to protect the first external electrodes 12a and the internal electrode unit 13 from the external environment.

The first external electrodes 12a may be formed by applying at least one paste of copper (Cu), a copper (Cu) based alloy and a copper-nickel (Cu—Ni) alloy.

The second electrodes 12b may be formed by applying paste having the same composition as that of the first external electrode 12a, or may be made of one of silver (Ag) paste and silver (Ag) epoxy.

At least one paste of the copper (Cu) based alloy and the copper-nickel (Cu—Ni) alloy is applied to and fired on the capacitor body 11 to thereby form the first external electrodes 12a electrically connected to the internal electrode unit 13. Thereafter, paste having the same composition as that of the first external electrode 12a, or one of silver (Ag) paste and silver (Ag) epoxy is applied to and fired on the first external electrode 12a to thereby form the second external electrodes 12b electrically connected to the first external electrode 12a. Accordingly, the density of the electrode is increased as shown in Table 1 below.

TABLE 1

| Classification | Related Art | Present Invention |
| --- | --- | --- |
| Density | 95~96% | 98% or more |
| Defective Rate | 5% | Below 3% |
| Plating Solution Penetration Rate | 10% | Below 5% |

It may be appreciated from Table 1 that, the external electrode having a doubled-layered structure according to an exemplary embodiment of the present invention, achieves higher density, as well as lower defectivity and plating solution penetration rates, as compared to a case of applying and forming external electrodes as a single layer according to the related art.

As set forth above, according to the exemplary embodiments of the present invention, the electrode paste is applied to the multi-layered ceramic capacitor in dual layers to form the external electrodes of the multi-layered ceramic capacitor as dual layer-electrodes, thereby making it possible to provide the multi-layered ceramic capacitor including the external electrodes having excellent density, while having excellent contact between the external and internal electrodes.

While the present invention has been described with reference to the exemplary embodiments and the accompanying drawings, it is not limited thereto but is defined only by the appended claims below. Therefore, it will be apparent to those skilled in the art that modifications and variations can be made without departing from the spirit and scope of the invention.

What is claimed is:

1. A multi-layered ceramic capacitor having a dual layer-electrode structure, comprising:
    a capacitor body formed as a stack of dielectric layers, each having a preset length and width;
    an internal electrode unit formed on the plurality of dielectric layers and having a preset capacitance; and
    an external electrode unit including first external electrodes respectively formed on both sides of the capacitor body to be electrically connected to internal electrodes, and second external electrodes formed on the first external electrodes, and
    wherein the first external electrodes are formed by applying at least one paste of copper (Cu), a copper (Cu) based alloy, and a copper-nickel (Cu—Ni) alloy.

2. The multi-layered ceramic capacitor of claim 1, wherein the second external electrodes are formed by being applied with paste having the same composition as that of the first external electrodes.

3. The multi-layered ceramic capacitor of claim 1, wherein the second external electrodes are made of one of silver (Ag) paste and silver (Ag) epoxy.

4. The multi-layered ceramic capacitor of claim 1, wherein the capacitor body is 0.6 mm±0.05 mm long and 0.3±0.05 mm wide.

5. The multi-layered ceramic capacitor of claim 4, wherein the capacitance of the internal electrode unit is 1 µF±10% or more.

6. The multi-layered ceramic capacitor of claim 1, wherein the capacitor body is 1.0 mm±0.05 mm long and 0.6±0.05 mm wide.

7. The multi-layered ceramic capacitor of claim 6, wherein the capacitance of the internal electrode unit is 10 µF±10% or more.

* * * * *